US007038717B2

(12) United States Patent
Dow et al.

(10) Patent No.: US 7,038,717 B2
(45) Date of Patent: *May 2, 2006

(54) APPLIANCE AND METHOD FOR MENU NAVIGATION

(75) Inventors: James C. Dow, Fort Collins, CO (US); Dan L. Dalton, Greeley, CO (US); Michael L. Rudd, Fort Collins, CO (US); Karin C. Ruffatto, Fort Collins, CO (US); Daniel Formosa, Montvale, NJ (US); Sandra Nieves, New York, NY (US); Paul Hamburger, New York, NY (US); Michael J. DeVries, Loveland, CO (US); Nancy Shepard, Arvada, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 682 days.

This patent is subject to a terminal disclaimer.

(21) Appl. No.: 10/052,009

(22) Filed: Jan. 18, 2002

(65) Prior Publication Data

US 2002/0060816 A1    May 23, 2002

Related U.S. Application Data

(62) Division of application No. 09/588,944, filed on Jun. 7, 2000, now Pat. No. 6,496,284, which is a division of application No. 09/130,082, filed on Aug. 7, 1998, now Pat. No. 6,292,273.

(51) Int. Cl.
*H04N 5/76* (2006.01)
*H04N 1/024* (2006.01)
*H04N 1/40* (2006.01)
*H04N 1/04* (2006.01)

(52) U.S. Cl. .............................. 348/231.3; 348/231.9; 348/231.6; 348/208.12; 358/473; 358/474; 358/444; 358/468

(58) Field of Classification Search ................ 358/473, 358/444, 474, 471, 527, 505, 483, 482, 512–514, 358/909.1, 231.99, 231.2, 468; 348/231.3, 348/231.2, 231.99, 231.6, 231.9, 208.12, 348/64, 207.1, 375, 376, 96–98, 207.11, 333.05, 348/333.01, 333.02; 382/313, 312; 707/200; 345/629, 156; 396/287, 281, 296
See application file for complete search history.

(56) References Cited

U.S. PATENT DOCUMENTS

| | | | | |
|---|---|---|---|---|
| 5,544,295 A | * | 8/1996 | Capps | 345/473 |
| 5,596,694 A | * | 1/1997 | Capps | 345/473 |
| 6,160,926 A | * | 12/2000 | Dow et al. | 382/313 |
| 6,232,973 B1 | * | 5/2001 | Dow et al. | 345/810 |
| 6,292,273 B1 | * | 9/2001 | Dow et al. | 358/473 |
| 6,301,020 B1 | * | 10/2001 | Dow et al. | 358/473 |
| 6,466,231 B1 | * | 10/2002 | Dow et al. | 345/629 |

(Continued)

*Primary Examiner*—Cheukfan Lee

(57) ABSTRACT

A capturing and viewing appliance and method are provided for capturing and communicating images to other appliances and devices with communication capabilities. The capturing and viewing appliance includes a processor for manipulating and viewing the images on a built-in display. Program code stored in internal memory includes a menu navigation interface application program which allows the user to use navigation buttons and operational buttons to operate the menu navigation interface in operating the appliance. The menu navigation interface provides a user-friendly interface for operating an appliance or other device through reuse of the navigation buttons and operational buttons in menu activation and deactivation as well as menu item selection.

24 Claims, 7 Drawing Sheets

U.S. PATENT DOCUMENTS

| | | | |
|---|---|---|---|
| 6,469,689 B1 * | 10/2002 | Dow et al. | 345/156 |
| 6,496,284 B1 * | 12/2002 | Dow et al. | 358/473 |
| 6,549,304 B1 * | 4/2003 | Dow et al. | 358/473 |
| 6,680,749 B1 * | 1/2004 | Anderson et al. | 348/231.99 |
| 6,765,612 B1 * | 7/2004 | Anderson et al. | 348/231.2 |
| 6,784,904 B1 * | 8/2004 | Dow et al. | 345/810 |

* cited by examiner

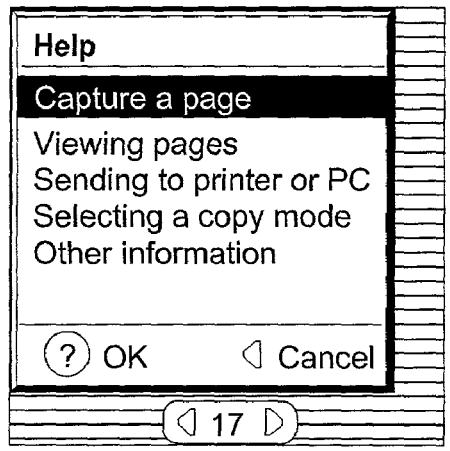
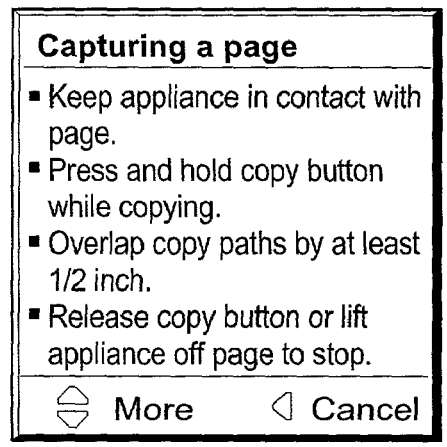
FIG. 9A  FIG. 9B
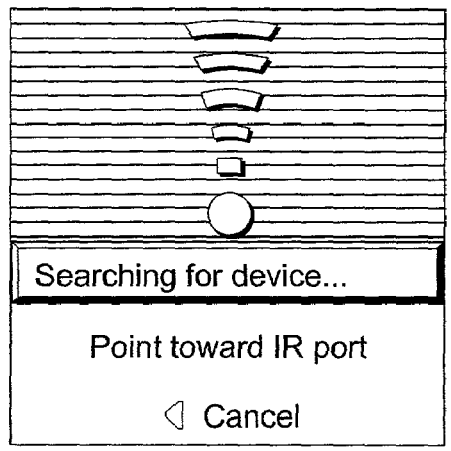
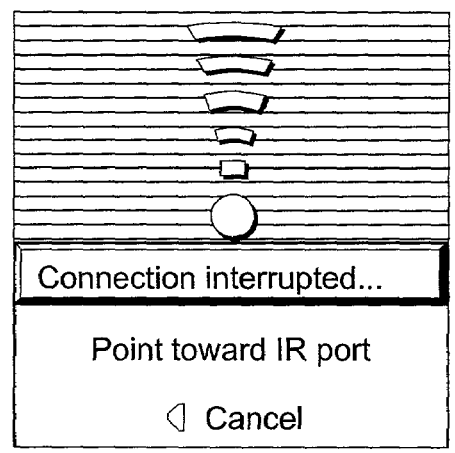
FIG. 10A  FIG. 10B

APPLIANCE AND METHOD FOR MENU NAVIGATION

CROSS REFERENCE TO RELATED APPLICATIONS

This application is a divisional of U.S. Utility Application Ser. No. 09/588,944, filed Jun. 7, 2000, entitled, "APPLIANCE AND METHOD OF USING SAME HAVING A DELETE CAPABILITY FOR SAVED DATA," now issued as U.S. Pat. No. 6,496,284 issued on Dec. 17, 2002, which is a division of application Ser. No. 09/130,082, filed Aug. 7, 1998, now U.S. Pat. No. 6,292,273, which is entirely incorporated herein by reference.

This application is also related to U.S. application entitled "APPLIANCE AND METHOD OF USING SAME HAVING A SEND CAPABILITY FOR STORED DATA," now issued as U.S. Pat. No. 6,396,518 issued on Dec. May 28, 2002; U.S. application entitled "APPLIANCE AND METHOD OF USING SAME HAVING A USER HELP CAPABILITY," now issued as U.S. Pat. No. 6,549,304 issued on Apr. 15, 2003; U.S. application entitled "APPLIANCE AND METHOD OF USING SAME HAVING A CAPABILITY TO GRAPHICALLY ASSOCIATE AND DISASSOCIATE DATA WITH AND FROM ONE ANOTHER," now issued as U.S. Pat. No. 6,469,689 issued on Oct. 22, 2002; U.S. application entitled "APPLICATION AND METHOD FOR COMMUNICATING AND VIEWING MULTIPLE CAPTURED IMAGES," now issued as U.S. Pat. No. 6,611,291 issued on Aug. 26, 2003; U.S. application entitled "APPLIANCE AND METHOD OF USING SAME FOR CAPTURING IMAGES," now issued as U.S. Pat. No. 6,466,231 issued on Oct. 15, 2002; and U.S. application entitled "APPLIANCE AND METHOD FOR VIEWING CAPTURED IMAGES," now issued as U.S. Pat. No. 6,441,927 issued on Aug. 27, 2002, which are all entirely incorporated herein by reference.

This application is also related to U.S. Pat. No. 6,292,273 B1, which is entitled "APPLIANCE AND METHOD OF USING SAME HAVING A DELETE CAPABILITY FOR SAVED DATA"; U.S. Pat. No. 6,232,973 B1, which is entitled "APPLIANCE AND METHOD FOR NAVIGATING AMONG MULTIPLE CAPTURED IMAGES AND FUNCTIONAL MENUS"; U.S. Pat. No. 6,301,020, which is entitled "APPLIANCE AND METHOD FOR CAPTURING IMAGES HAVING A USER ERROR INTERFACE"; and U.S. Pat. No. 6,160,926, which is entitled "APPLIANCE AND METHOD FOR MENU NAVIGATION," which are incorporated herein by reference.

BACKGROUND OF THE INVENTION

1. Field of the Invention

The present invention generally relates to the field of digital capturing and, more particularly, relates to a user interface for a portable hand-held capturing and communicating appliance for navigating menus for the purposes of capturing and viewing images through digital scanning or other means of capturing and communicating those images to other devices.

2. Related Art

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded. Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them effectively and distribute them in a timely fashion. Users can share and distribute information easily by scanning directly to their email or PC fax applications. The growing popularity of fax modems and email is driving the acceptance of scanner-enabled document distribution in offices of all sizes. Fax/modem capabilities, which are available with virtually all modern PCs, enable users to send and receive faxes directly from a computer—at their desk or while traveling—and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animations to assist users in operating their device. Finally, transfer of images is limited to those devices having ports for receiving an external memory card or the capability of reading the scanner memory through a memory card drive.

Accordingly, a heretofore unaddressed need exists in the industry for providing a hand-held image capturing appliance and method that allows users to navigate among menus in the appliance reusing operational buttons in menu activation and menu item selection in operating the appliance. The hand-held image capturing appliance must be able to transfer the captured images to some other unit such as a computer, printer, or facsimile machine. In addition, the capturing device should provide cordless operation and use a standard interface for transferring images to other devices. A GUI is preferred to assist users, particularly novices, in operating the device.

SUMMARY OF THE INVENTION

The present invention overcomes the inadequacies and deficiencies of the prior art as discussed hereinbefore. The present invention provides an image capturing appliance, which, as a non-limiting example, may be a digital camera, incorporating a menu navigation interface for communicating with and allowing the user to navigate menus by reusing operational buttons in operating the appliance, as well as view captured images on the appliance and communicate those captured images to other devices. This interface, in conjunction with other interfaces, facilitates ease of use and hardware simplification and miniaturization of the capturing appliance for seamless integration of the appliance into a consumer's existing tools and processes.

The capturing appliance contains a capturing means such as photocells and a storage means for storing captured images. A processing means is also provided for processing the acquired image and displaying it on a self-contained display of the appliance. Program instructions are provided in the memory of the appliance and allows the user to process images through menus of options presented on the display. A plurality of operational buttons are disposed on the front of the appliance for invoking such operations as sending or transmitting a captured image, deleting a captured image, rotating a captured image, or grouping captured images together.

According to an aspect of the invention, the appliance includes a plurality of navigation buttons that are used to select a specific option from the menu. The software program includes a code segment for demarcating the user selection from other menu items. Advantageously, button reuse is promoted as the selection of a particular menu option is confirmed through operation of the same operational button used to activate the menu. As a result, the need for a separate "enter" button is obviated. Further, a menu is deactivated by operation of a navigation button otherwise used to navigate multiple captured images in memory and to move a metaphoric icon in selecting an area on a captured image.

The present invention has many advantages, a few of which are delineated hereafter, as examples.

An advantage of the menu navigation interface and method of the present invention is that they provide a simple procedure for operating an appliance using functional buttons.

Another advantage of the menu navigation interface and method of the present invention is that they provide a more flexible and user friendly procedure for operating an appliance.

Another advantage of the menu navigation interface and method of the present invention is that they provide a procedure for navigating menus of an appliance which is simple, easy to learn and efficient.

Another advantage of the menu navigation interface and method of the present invention is that they promote instrument reuse in operating the appliance.

Another advantage of the menu navigation interface and method of the present invention is that they can be employed in virtually any graphical user interface (GUI).

Other features and advantages of the present invention will become apparent to one with skill in the art upon examination of the following drawings and detailed description. It is intended that all such additional features and advantages be included herein within the scope of the present invention, as is defined by the claims.

BRIEF DESCRIPTION OF THE DRAWINGS

In the accompanying drawings:

FIG. 9A illustrates the help menu as displayed on the display screen of FIG. 1A;

FIG. 9B illustrates the capturing a page instructions as displayed on the display screen of FIG. 1A;

FIG. 10A illustrates the infra-red discovery screen with left navigation button designation as displayed on the display screen of FIG. 1A.;

FIG. 10B illustrates the interruption of an infra-red search with left navigation button designation as displayed on the display screen of FIG. 1A.

DETAILED DESCRIPTION OF THE PREFERRED EMBODIMENT

Figure 1A:
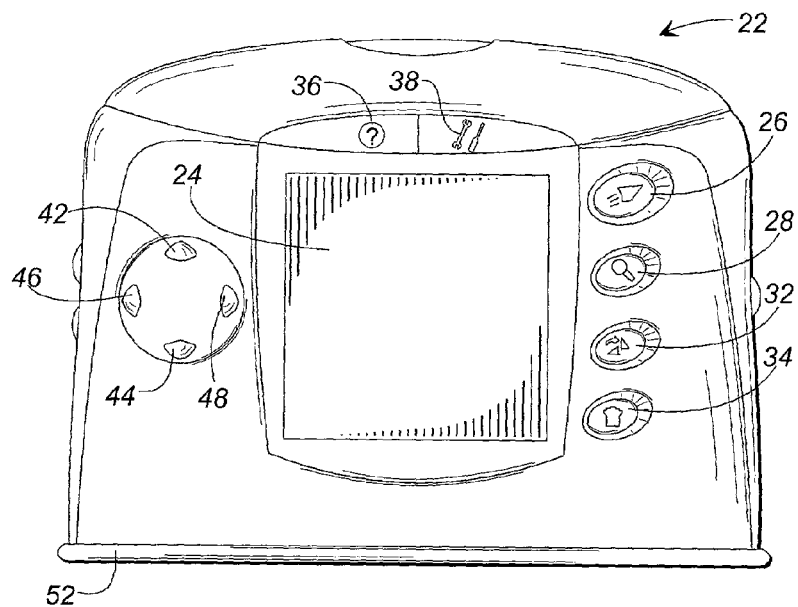
FIG. 1A is an elevation view of the hand-held image capture and communication appliance according to the present invention, which depicts a side of the unit containing the display screen, operation buttons, and navigation buttons.

Reference is now made to the drawings wherein like reference numerals designate corresponding parts throughout these several figures. It should be understood by those skilled in the art that some aspects of the present invention may be practiced on any apparatus for the purposes of navigating menus, not limited to apparatuses which include or do not include image capturing capabilities through a photoelement array or scanning. For example, a user may use the menu navigation interface of the present invention for navigating menus on different types of computers and other electronic devices, especially hand-held, portable information appliances.

Architecture of the Image Capture and Communication Appliance

A portable, hand-held, image capture and communication appliance 22 embodying the principles of the present invention is shown in FIGS. 1A through 1D. Specifically, FIG. 1A depicts one side (i.e., front) of appliance 22 where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22. Common types of flat-panel displays suitable for use in the present invention include electroluminescent displays, gas plasma discharge displays, liquid crystal displays (LCDs) and field emission displays (FEDs). Display 24 is the means by which information, including captured images, text, icons, and animations, is communicated to the user.

The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been scanned into memory through photoelement array 52. Activation of tools button 38 presents the user with a menu that includes possible image operations (e.g., image attachment/grouping, image detachment/ungrouping), changing the mode of appliance 22 (i.e., toggling between text (binary) capture and image (grayscale) capture), calibrating appliance 22, displaying a screen identifying important specifications such as a model number, hardware or software release number, memory equipage, etc., or other user utilities not deserving of a dedicated external button for activation. Help button 36 provides the user with access to both general tutorials, process animations, and how-to instructions on the operation of appliance 22 and context sensitive instruction when requested while another operation or menu is active.

The navigation buttons include an up button 42, a down button 44, a left button 46, and a right button 48 and are controlled by the user to steer a course through menu items and to view images or pages that have been captured in memory. Additionally, the left button 46 is used to deactivate an active menu.

Figure 1B:
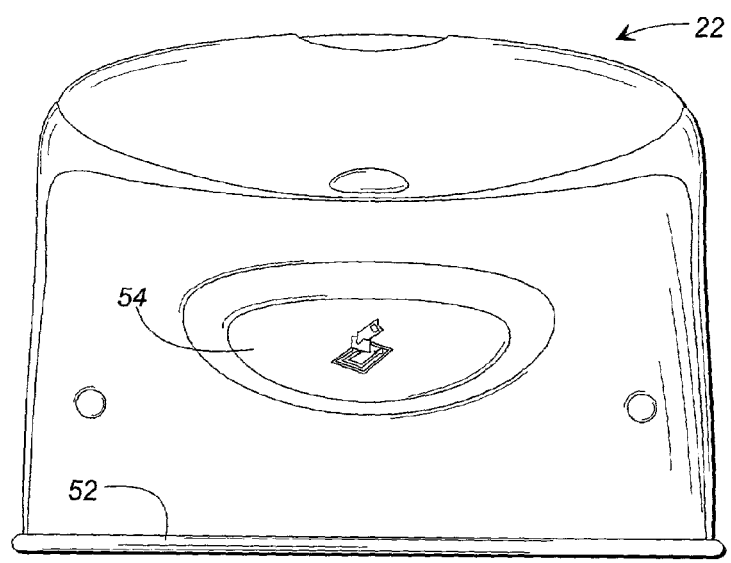
FIG. 1B is an elevation view of the appliance of FIG. 1A depicting the opposing side to that illustrated in FIG. 1A, which contains the capture button for performing an image capture.
Figure 1C:
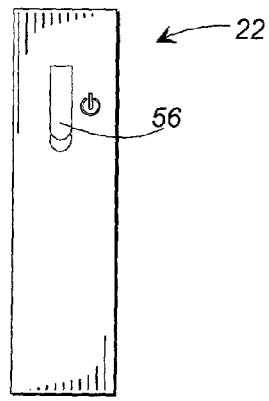
FIG. 1C is an elevation view of the appliance of FIGS. 1A and 1B depicting an end of the unit, which contains the power button.
Figure 1D:
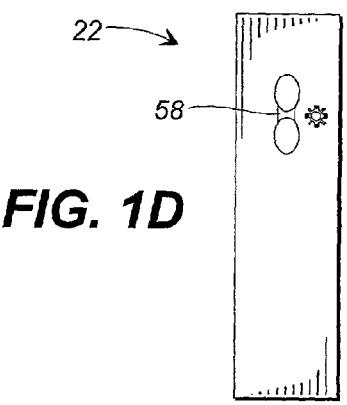
FIG. 1D is an elevation view of the appliance of FIGS. 1A, 1B, and 1C depicting the opposing end to that illustrated in FIG. 1C, which contains a brightness button for adjusting the visual clarity of the display screen.

FIG. 1B shows the side of appliance 22 opposite that illustrated in FIG. 1A (i.e., back). The back side of appliance 22 includes image capture button 54, which is depressed by a user to scan an image through photoelement array 52 and is released once the image is captured. A power button 56 is included at one end of appliance 22 as shown in FIG. 1C and a contrast control 58 for display 24 is located at the other end of appliance 22 as shown in FIG. 1D. The positioning of the various buttons, power switch 56 and contrast control 58 on appliance 22 as shown in FIGS. 1A through 1D is merely exemplary and can be modified as needed to satisfy the ergonomic requirements of the targeted user community.

Figure 2:
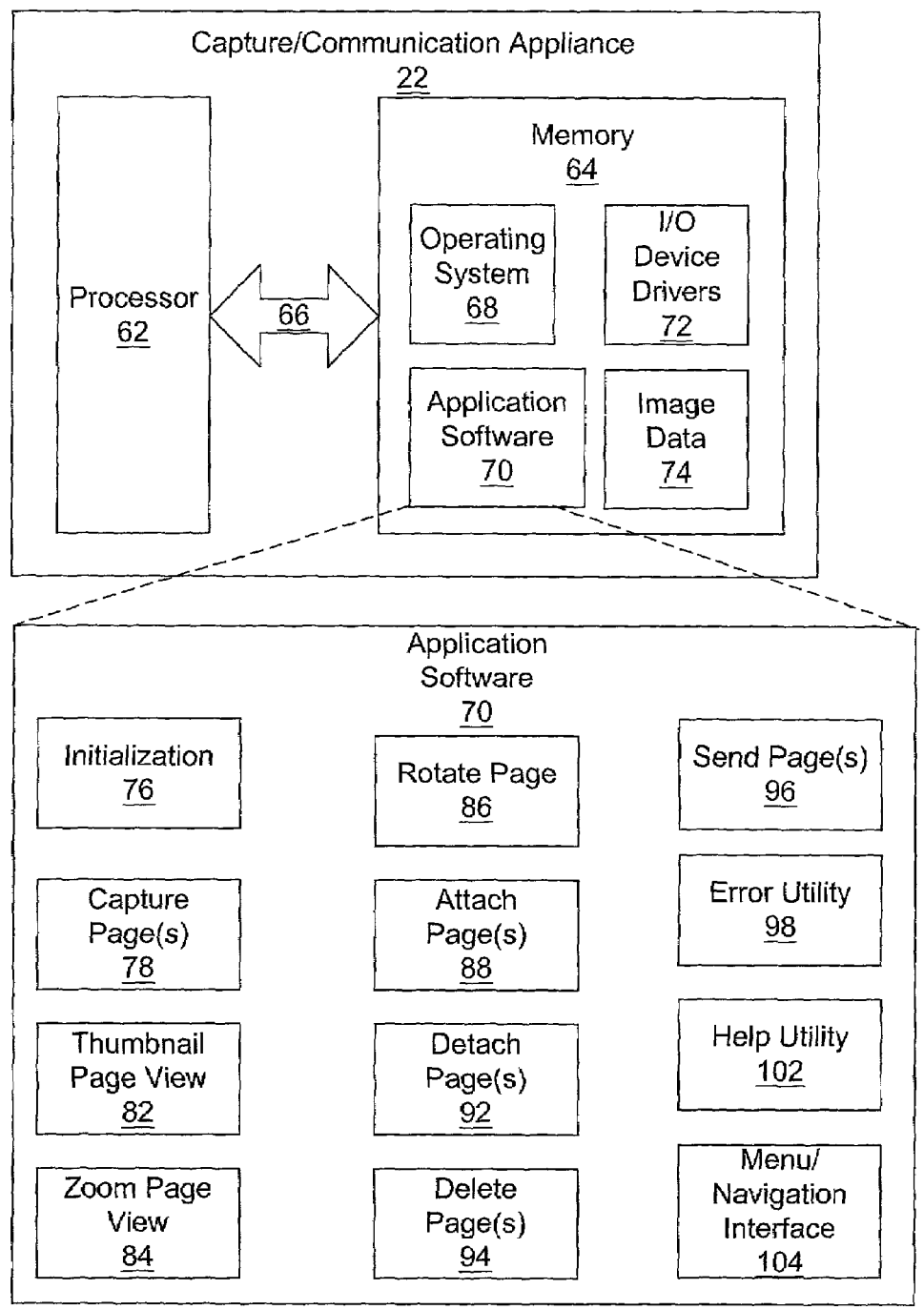
FIG. 2 is a high-level block diagram of the internal hardware and software architecture of the appliance illustrated in FIGS. 1A–1D.

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM.

As shown in FIG. 2, memory 64 holds four major categories of software and data used in appliance 22: the operating system 68; the application software 70; the I/O device drivers 72; and the image data 74 generated for each scan. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., Santa Clara, Calif., U.S.A., which is used in the preferred embodiment of the present invention. I/O device drivers 72 include software routines accessed through operating system 66 by application software 70 to communicate with devices such as display 24, certain memory components 64 and I/O ports such as a serial port or infra red (IR) port for transferring data to another appliance, device or system. The binary representations of the images captured by appliance 22 is denoted by image data 74. The format used for storing the images should be compatible with application software 70. One common format used for encoding images is the JPEG standard; however, other public or proprietary standards can be used with equal success. In the preferred embodiment, CCITT-G4, which is designed for facsimile usage, is used. Finally, application software 70 comprises the control programs that implement the various features of appliance 22. Application software 70 and devices drivers 72 are typically written in a high-level programming language such as C or C++ for development convenience. Nevertheless, some drivers or application modules are sometimes written in assembly or machine language to optimize speed, memory usage or layout of the software in memory. In the preferred embodiment, the present invention uses C language to implement application software 70 and device drivers 72 and assembly language for the most time-critical sections.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. Note that an image captured in memory is interchangeably referred to herein as a "page" because the image is portrayed in appliance 22 as a physical page of text and/or imagery. A brief overview of each of the aforementioned modules follows hereafter.

Figure 4A:
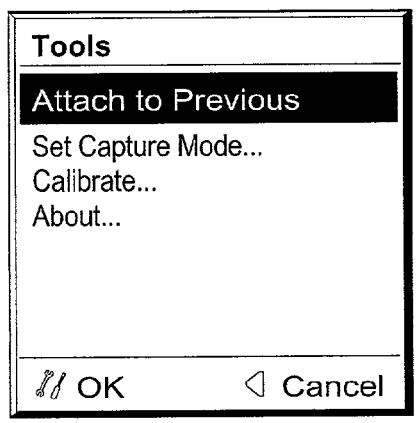
FIG. 4A illustrates the attach version of the tools menu as it appears on the display screen of FIG. 1A.
Figure 4B:
FIG. 4B illustrates a first page group thumbnail image with navigational button descriptors as displayed on the display screen of FIG. 1A.
Figure 4C:
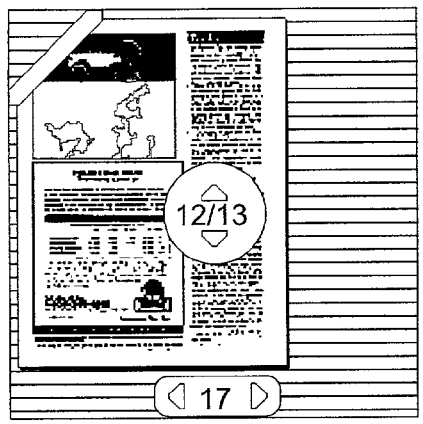
FIG. 4C illustrates a page within a group thumbnail view of an image with navigational button descriptors as displayed on the display screen of FIG. 1A.
Figure 5A:
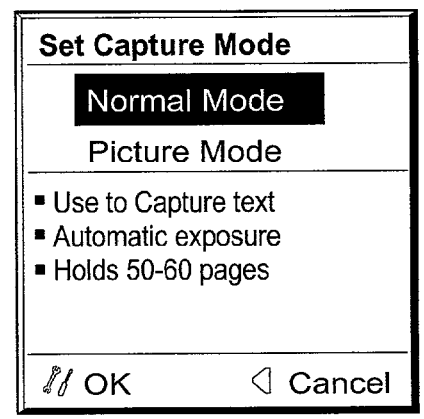
FIG. 5A illustrates the set capture mode menu with normal mode description displayed on the display screen of FIG. 1A.
Figure 5B:
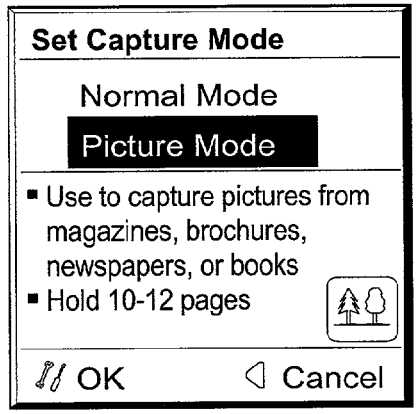
FIG. 5B illustrates the set capture mode menu with picture mode description as displayed on display screen of FIG. 1A.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. Thumbnail view module 82 provides the default visual for pages and icons shown on display 24. The thumbnail view presents an entire page on display 24 as illustrated in FIG. 4B. Zoom view module 84 allows the user to magnify a portion of a page. Page rotation module 86 allows the user to rotate a page either in thumbnail or zoom view in 90° increments. Attach page module 88 allows the user to logically join pages together to form a group of pages as illustrated in FIG. 4A through FIG. 4C that can be deleted, sent or viewed as an individual unit, but not rotated or zoomed. Rotation and zoom always apply only to the current page. Conversely, detach page module 92 allows the user to separate a page or pages from a previously formed group. Delete page module 94 allows the user to purge a page or group of pages from memory 64. Send page module 96 allows the user to transfer a page or group of pages to another appliance, device or system through the serial or IR communication ports of appliance 22. Error utility module 98 provides notification to the user when the user attempts an invalid operation. Help utility module 102 provides the user, in real time, with general instructions and animation on operating appliance 22 and context sensitive instructions for performing a specific operation. Lastly, menu/navigation interface module 104 provides the user with graphical menus for performing various operations and processes the user's response thereto. Moreover, menu/navigation interface module 104 responds to navigation buttons 42, 44, 46, and 48 that allow the user to steer a course through the graphical menus in operating the appliance and works in conjunction with the thumbnail view module 82 to view the stored pages. The operation of the menu/navigation interface module 104 will be discussed hereinafter.

Figure 3:
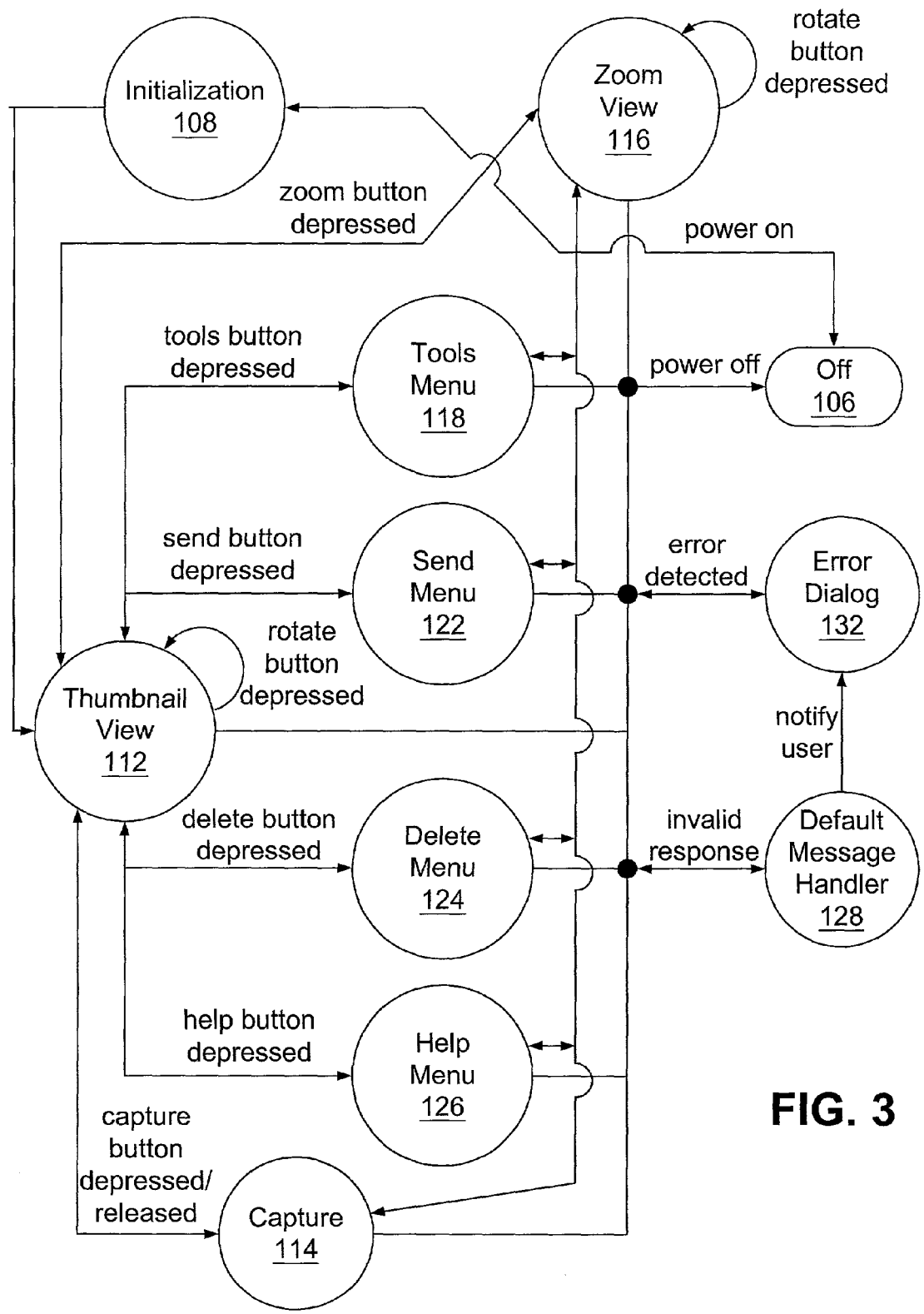
FIG. 3 is a high-level state diagram of the application software of FIG. 2.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image capture. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28 or performing certain actions such as capture, send, delete, attach, detach, etc. Additionally, the thumbnail view state 112 includes functionality for the empty (no image) state and the image verification state.

Figure 6A:
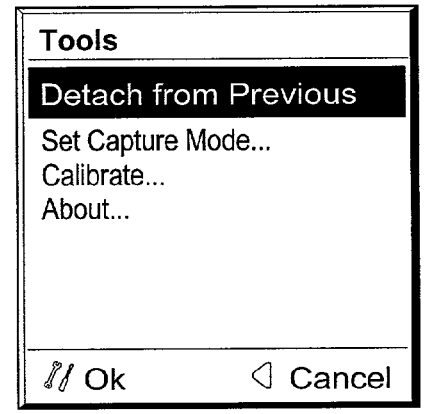
FIG. 6A illustrates the detach version of the tools menu as it appears on the display screen of FIG. 1A.
Figure 6B:
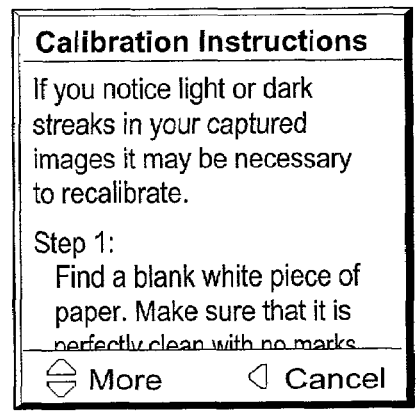
FIG. 6B illustrates the calibration instructions as displayed on the display screen of FIG. 1A.
Figure 7A:
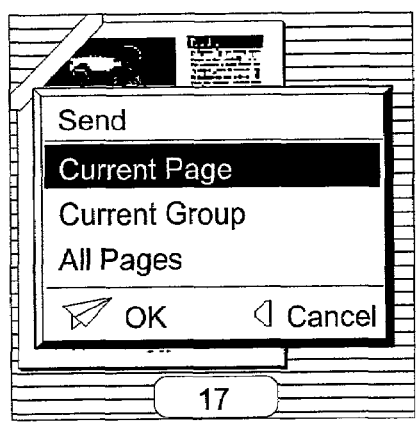
FIG. 7A illustrates the send menu as displayed on the display screen of FIG. 1A.
Figure 7B:
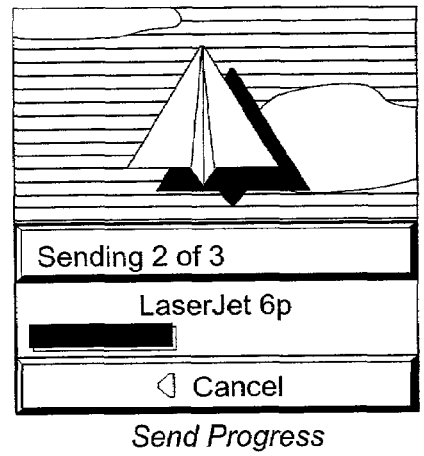
FIG. 7B illustrates the send progress screen as displayed on the display screen of FIG. 1A.
Figure 8A:
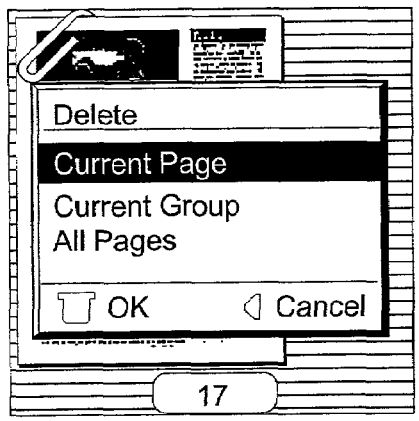
FIG. 8A illustrates the delete menu as displayed on the display screen of FIG. 1A.
Figure 8B:
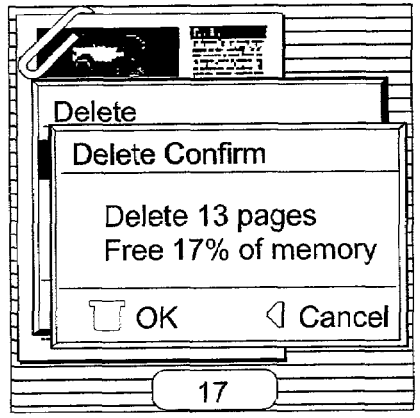
FIG. 8B illustrates the delete confirmation dialog box as displayed on the display screen of FIG. 1A.

From thumbnail view state 112, one of four menu states can be entered depending on the choice made by the user. First, activation of tools button 38 will transition the system into tools menu state 118 where a menu of possible page operations and/or features is exhibited on display 24 as illustrated in FIGS. 4A and 6B. Second, activation of send button 26 will transition the system into send menu state 122 where a menu of options for transferring a page or group of pages to another appliance, device or system is exhibited on display 24 as illustrated in FIG. 7A. Third, activation of delete button 34 will transition the system into delete menu state 124 where a menu of options for deleting a page or group of pages from memory 64 is exhibited on display 24 as illustrated in FIG. 8A and FIG. 8B. Lastly, activation of help button 36 will transition the system into help menu state 126 where a menu of help topics is exhibited on display 24 as illustrated in FIG. 9A. Once any of the aforementioned menu states is reached, the user can choose a desired menu option by using navigation buttons 42 and 44 and then validating the choice by pressing a confirmation button, which is the same button used to activate the menu. Menu states may be exited or "canceled" by simply invoking a navigation button to transition to a previous state. In the preferred embodiment of the present invention, the left navigation button 46 has been designated as the cancel button in menu states.

From some states, an invalid response by the user (i.e., user presses an inactive button) will be ignored or will result in a transition to the default message handler state 128 where the user response is interpreted through the message that was generated internally and a transition is made to the error dialog state 132 to notify the user of their error via a message or graphic on display 24. Inactive buttons will occasionally also display a blinking icon to communicate to the user the selection of the inactive button and which buttons are active. Alternatively, error dialog state 132 can be entered directly if application software 70 detects an error in the execution of a valid operation. The most common example of this is when the user follows an improper capture path with appliance 22 during the image capture process. In the preferred embodiment, within error dialog boxes, the left navigation button 46 has been designated as the cancel button to provide user acknowledgment and remove the error dialog box from the display screen 24 as displayed in FIG. 10B.

The features provided by the menu/navigation interface software module 104 for menu navigation will be described hereafter with frequent reference to (a) the architecture and operation of the application software 70 of FIG. 2; (b) the flowchart of FIG. 11 and (c) the captured screen illustrations of FIG. 4A through FIG. 10B.

Operation of the Menu Navigation Interface and Method

Recall from the state diagram of FIG. 3 that when power is provided via switch 56 (FIG. 1C) application software 70 passes through a transient initialization state 108 to reach thumbnail view state 112, which is the default state for capturing images using capture button 54 and viewing images. Upon successfully capturing an image, the image is displayed as a thumbnail size icon on the display 24 (FIG. 1A). From the thumbnail view state, the appliance may reach various other states, i.e. TOOLS MENU 118, SEND MENU 122, DELETE MENU 124, HELP MENU 126 where users interact with a menu or message box to operate the appliance in that state. ERROR DIALOG 132 messages can be entered from any state. In all of the aforementioned states, the navigation buttons 42, 44, 46, and 48 serve functions in conjunction with other operational buttons to enable the user to operate the appliance.

Figure 11:
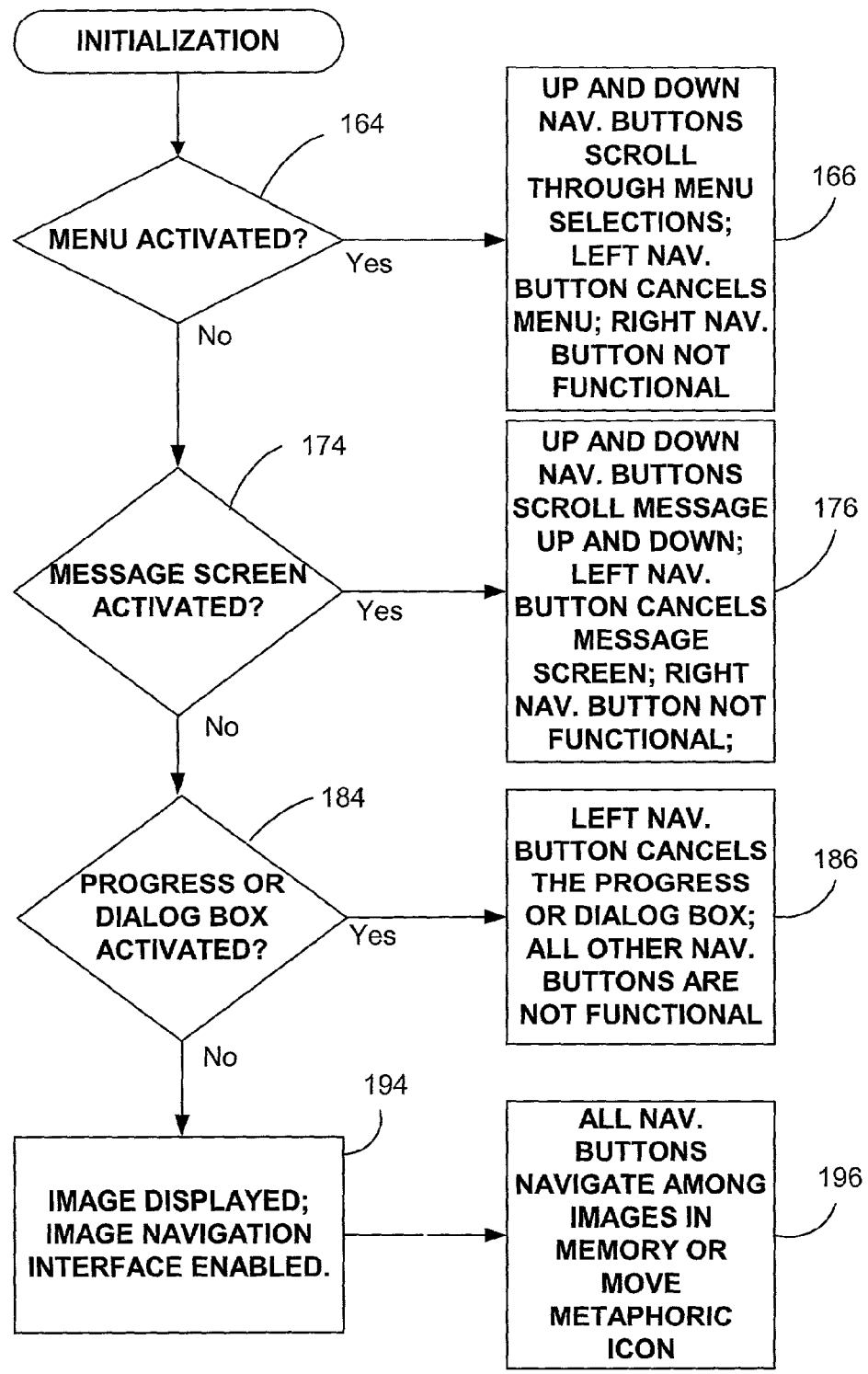
FIG. 11 is a functional flowchart showing the design and operation of the navigation buttons of FIG. 1A within the menu navigation interface.

FIG. 11 is a functional flowchart detailing the operation of the navigation buttons 42, 44, 46, 48 within the menu navigation interface and method. After initialization of the appliance at power up, the menu/navigation interface software module 104 then determines whether navigation of images is needed or whether a menu, message screen or dialog box navigation is needed. The logic checks if a menu is activated 164. Menus may be activated by selection of an operational or functional button of the appliance, such as the send button 26, the delete button 34, the help button 36, and the tools button 38. If so, the logic configures the up navigation button 42 and down navigation button 44 to scroll a highlight bar though the selections of the menu 166 as shown in FIG. 4A, FIG. 5A, FIG. 5B, FIG. 6A, FIG. 7A, FIG. 8A and FIG. 9A. The left navigation button 46 is designated as an exit button and will exit from the menu and return the appliance to a previous state 166. In the preferred embodiment, the right navigation button 48 is inactive in all menu states. Advantageously, once the user has selected a menu item using navigation buttons 42 and 44, the selection is confirmed using the same operational button (i.e., send button 26, delete button 34, help button 36 or tools button 38) that was originally invoked to display the menu. As a result, an additional "enter" button is not required for confirming menu selections, which is very beneficial in hand held devices such as appliance 22 where button space on the device is limited. Using the same button is also faster and more convenient than finding and pressing a separate enter button. It should be understood by those skilled in the art that any operational button, including the right navigation button 48 could have been used to initiate menu selection confirmation.

If a message screen is activated 174 as illustrated in FIG. 6B and FIG. 9B, the up and down navigation buttons 42, 44 are configured to scroll the message up and down within the message box 176. The left navigation button 46 is designated as the cancel button and cancels the message screen 176. The right navigation button 48 is not functional 176. If a progress screen as illustrated in FIG. 10A or dialog box is activated 184, the left navigation button 46 cancels the progress or dialog box 186. All other navigation buttons 42, 44, 48 are not functional 186.

If the menu, message screen, or progress/dialog box is not activated, the logic determines that image navigation is necessary and enables image navigation interface 194 of the menu/navigation interface software module. In this interface, all navigation buttons 42, 44, 46, 48 navigate among images in memory or move a metaphoric icon across the screen to a designated area to be magnified 196 in a greater pixel resolution. As shown in FIG. 4B and 4C, the up navigation button 42 and down navigation button 44 are designated within the interface to "flip" through the pages within a group. FIG. 4B illustrates the first page of a group using a metaphoric paper clip in the top left hand corner. FIG. 4C illustrates a page within the group as symbolized by the "folded" upper left corner. Icons on these pages indicate the navigational buttons 42 and 44 activated to "flip" through the pages as well as which page in the group is currently being displayed. Finally, the "license plate" at the bottom of FIG. 4B and 4C communicate to the user which location in the contiguous locations in memory the group holds. It is also accompanied by navigational button 46 and 48 indicators to communicate to the user that these navigational buttons 46 and 48 will display the next or previous image displayed in the contiguous memory location before or after the group of pages.

The menu navigation interface program 104 of the present invention can be implemented in hardware, software, firmware, or a combination thereof. In the preferred embodiment(s), the menu navigation interface program 104 is implemented in software or firmware that is stored in a memory 64 and that is executed by a suitable instruction execution system.

The menu navigation interface program 104, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory 64.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A digital camera, comprising:
  a photoelement array for acquiring image data;
  a memory for saving said image data;
  a processor in communication with said memory;
  a display in communication with said processor for exhibiting said image data;
  a plurality of navigation buttons;
  a plurality of operational buttons; and
  program code stored in said memory and executed by said processor, said program code comprising a menu navigation interface module for allowing a user to select one of a plurality of menu options in response to the invocation of one of said navigation buttons, so that the functionality of said plurality of navigation buttons changes from a first set of navigation button operating functions to a second set of navigation button operating functions which correspond to a plurality of menu functions associated with a selected menu;

wherein one of said navigation buttons is used to exit from said menu.

2. The digital camera of claim 1, wherein said program code further comprises:

a first code segment for demarcating one of a plurality of menu options displayed on said display, said demarcation representing a selection of one of said menu options.

3. The digital camera of claim 2, wherein said demarcation is directionally moved among said plurality of menu options using said navigation buttons.

4. The digital camera of claim 3, wherein said demarcation is bi-directionally moved using a pair of said navagation buttons.

5. The digital camera of claim 4, wherein said pair of navigation buttons comprises an up navigation and down navigation button.

6. The digital camera of claim 3, wherein said selection of said option is confirmed by the user through invocation of said operational button invoked to provide said menu.

7. The digital camera of claim 1, further comprising:

means for communicating image data to a remote device.

8. A digital camera, comprising:

capturing means for acquiring image data;

storage means for saving said image data;

processing means in communication with said storage means;

display means in communication with said processing means for exhibiting said image data;

a navigation means;

operation activation means; and program code stored in said storage means and executed by said processing means for manipulating said image data, said program code comprising a menu navigation interface module for allowing a user to select one of a plurality of menu options in response to the invocation of said navigation means, so that the functionality of said navigation means changes from a first set of navigation operating functions to a second set of navigation operating functions which correspond to a plurality of menu functions associated with a selected menu;

wherein said navigation means is a plurality of navigation buttons, wherein one of said navigation buttons is used to exit from said menu of options, status and information dialogs.

9. The digital camera of claim 8, wherein said menu navigation interface module comprises:

a first code segment for demarcating one of said options displayed on said display, said demarcation representing a selection of said option.

10. The digital camera of claim 9, further comprising navigation means for moving said demarcation among said menu of options.

11. The digital camera of claim 10, wherein said operation activation means is a plurality of operational buttons.

12. The digital camera of claim 8, wherein said selection of said option is confirmed by the user through invocation of said operational button invoked to provide said menu.

13. The digital camera of claim 8, further comprising:

a second code segment for providing an icon representative of said navigation buttons on said display.

14. The digital camera of claim 13, wherein said icon comprises:

a pair of opposing arrows with each arrow uniquely representing a logical scroll direction.

15. The digital camera of claim 14, wherein said icon further comprises:

a third arrow representing said navigation button used to exit from said menu.

16. The digital camera of claim 8, further comprising:

means for communicating image data to a remote device.

17. An interface method for invoking the operation of a digital camera having a built-in display, comprising the steps of:

selecting one of a plurality of menus in response to an invocation of one of a plurality of functional buttons;

changing the functionality of a plurality of navigation buttons in response to selecting one of said menus from a first set of navigation button operating functions to a second set of navigation button operating functions, such that said second set of navigation button operating functions correspond to a plurality of menu functions associated with said selected menu; and exiting said menu in response to an invocation of one of said plurality of navigation buttons;

wherein changing the functionality of said plurality of navigation buttons to said first set of navigation button operating functions is made in response to said exiting.

18. The method of claim 17, further comprising the step of:

displaying an icon representative of at least one of said plurality of navigation buttons on a display.

19. The method of claim 17, wherein the step of selecting one of a plurality of menus is made in response to an invocation of one of a plurality of operational buttons.

20. The method of claim 17, further comprising the step of:

communicating image data to a remote device.

21. A computer readable medium having a program for manipulating image data acquired by a digital camera, said program code comprising:

logic configured for displaying a plurality of menus, each one of said plurality of menus comprising at least one option displayed on a display, said options corresponding to operations capable of execution by said digital camera;

logic configured for demarcating one of said options, said demarcation representing a user selection of said option;

logic configured for associating a first set of operating button operating functions with a plurality of operating buttons, such that said first set of operating button operating functions corresponds to a first menu selected from said plurality of menus;

logic configured for associating a second set of operating button operating functions with said plurality of operating buttons, such that said second set of operating button operating functions corresponds to a second menu selected from said plurality of menus; and logic configured for processing a user selection of one of said options;

wherein said plurality of operating buttons are a plurality of navigation buttons; and further comprising logic configured for exiting said menu of options in response to an invocation of one of said plurality of navigation buttons by the user.

22. The computer readable medium of claim 21, further comprising:

logic configured for moving said demarcation in response to a logical scroll direction entered by the user through one of a plurality of navigation buttons.

23. The computer readable medium of claim 21, further comprising:

logic configured for providing an icon representative of said navigation buttons on said display.

24. The computer readable medium of claim 21, further comprising:

logic configured for communicating image data to a remote device.

* * * * *

UNITED STATES PATENT AND TRADEMARK OFFICE
CERTIFICATE OF CORRECTION

PATENT NO. : 7,038,717 B2 Page 1 of 1
APPLICATION NO. : 10/052009
DATED : May 2, 2006
INVENTOR(S) : James C. Dow et al.

It is certified that error appears in the above-identified patent and that said Letters Patent is hereby corrected as shown below:

In column 1, line 13, delete "is" and insert -- are --, therefor.

In column 11, line 18, in Claim 4, delete "navagation" and insert -- navigation --, therefor.

Signed and Sealed this

Nineteenth Day of May, 2009

JOHN DOLL
*Acting Director of the United States Patent and Trademark Office*